(12) United States Patent
Gillespie et al.

(10) Patent No.: US 8,458,788 B2
(45) Date of Patent: Jun. 4, 2013

(54) SYSTEM AND METHOD FOR AUTHENTICATION OF INPUT DEVICES

(75) Inventors: David W. Gillespie, Los Gatos, CA (US); Raymond Alexander Trent, Jr., San Jose, CA (US)

(73) Assignee: Synaptics Incorporated, Santa Clara, CA (US)

( * ) Notice: Subject to any disclaimer, the term of this patent is extended or adjusted under 35 U.S.C. 154(b) by 214 days.

(21) Appl. No.: 12/908,543

(22) Filed: Oct. 20, 2010

(65) Prior Publication Data

US 2011/0277030 A1    Nov. 10, 2011

Related U.S. Application Data

(60) Provisional application No. 61/331,234, filed on May 4, 2010.

(51) Int. Cl.
    *G06F 21/00*    (2006.01)

(52) U.S. Cl.
    USPC .......................................................... 726/17

(58) Field of Classification Search
    USPC ............................... 726/17, 4, 21, 2; 713/182
    See application file for complete search history.

(56) References Cited

U.S. PATENT DOCUMENTS

| | | | |
|---|---|---|---|
| 6,513,117 B2 | 1/2003 | Tarpenning et al. | |
| 7,000,115 B2 | 2/2006 | Lewis et al. | |
| 7,058,811 B2 | 6/2006 | Spain et al. | |
| 7,870,053 B1 * | 1/2011 | Bergman et al. | 705/37 |
| 8,233,624 B2 * | 7/2012 | Ollikainen et al. | 380/262 |
| 2003/0235303 A1 | 12/2003 | Evans et al. | |
| 2005/0017958 A1 | 1/2005 | Silverbrook et al. | |
| 2005/0073507 A1 | 4/2005 | Richter et al. | |
| 2006/0059345 A1 | 3/2006 | Fayad et al. | |
| 2007/0255959 A1 | 11/2007 | Jung et al. | |
| 2008/0159534 A1 * | 7/2008 | Rager et al. | 380/247 |
| 2008/0189554 A1 | 8/2008 | Ali et al. | |
| 2008/0288116 A1 * | 11/2008 | Nickerson | 700/284 |
| 2008/0301775 A1 | 12/2008 | Ollikainen et al. | |
| 2009/0222910 A1 * | 9/2009 | Le Bihan et al. | 726/19 |

OTHER PUBLICATIONS

Schneier, Bruce. Applied Cryptography: Protocols, Algorithms, and Source Code in C. New York ; Toronto: J. Wiley, 1996. p. 47-73.
Smith, Richard E. Authentication: from Passwords to Public Keys. Boston: Addison-Wesley, 2002. p. 369-373.
"International Search Report" mailed Dec. 23, 2012; International Appln. No. PCT/US2011/034262, filed Apr. 28, 2011.

* cited by examiner

*Primary Examiner* — Brandon Hoffman
*Assistant Examiner* — Anthony Brown
(74) *Attorney, Agent, or Firm* — Ingrassia Fisher & Lorenz P.C.

(57) ABSTRACT

Systems and methods are provided for authenticating an input device subsystem for operation with a host. One method includes storing a table comprising challenges and a plurality of values indicative of authentic responses to the plurality of challenges. A selected challenge is then communicated between the input device subsystem and the host. A challenge response is derived based on the selected challenge and a hashing algorithm, and the challenge response is communicated between the input device subsystem and the host. The challenge response and one or more of the values is used to determine whether the challenge response is authentic. Functionality of the input device subsystem with the host is selectively enabled if the challenge response is authentic.

18 Claims, 5 Drawing Sheets

SYSTEM AND METHOD FOR AUTHENTICATION OF INPUT DEVICES

CROSS-REFERENCE TO RELATED APPLICATIONS

This application claims priority to U.S. Provisional Patent Application No. 61/331,234, filed May 4, 2010, the contents of which are hereby incorporated by reference.

FIELD OF THE INVENTION

The present invention generally relates to electronic devices, and more specifically relates to sensor devices.

BACKGROUND OF THE INVENTION

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Currently known techniques for enabling input device subsystems to function with their corresponding hosts (e.g., the various drivers, microprocessors, or the like provided to communicate with the input device subsystem) are unsatisfactory in a number of respects. For example, conventional systems cannot effectively determine whether a particular input device is intended for use with a particular host. This invites, for example, the use of counterfeit or otherwise unauthorized input device subsystems with a particular computer or other such host, which can lead to an unsatisfactory user experience. At the same time, conventional digital signature mechanisms of the type used to provide similar forms of authentication are undesirably slow and CPU-intensive in the context of current input device subsystems.

Accordingly, there is a need for improved systems and methods for authenticating input device subsystems with their corresponding hosts. Other desirable features and characteristics will become apparent from the subsequent detailed description and the appended claims, taken in conjunction with the accompanying drawings and the foregoing technical field and background.

BRIEF SUMMARY OF THE INVENTION

In accordance with one embodiment of the present invention, a processing system for an input device includes a sensing module configured to acquire a set of sensor values using at least one sensing element of the input device, and an authentication module configured to derive a challenge response based on a selected challenge and a hashing algorithm, wherein the challenge response is communicated to a host to selectively enable functionality with the host.

In accordance with another embodiment of the present invention, a method of authenticating an input device subsystem for operation with a host includes: storing a table comprising a plurality of challenges and a plurality of values indicative of authentic responses to the plurality of challenges; communicating a selected challenge between the input device subsystem and the host; deriving a challenge response based on the selected challenge and a hashing algorithm; communicating the challenge response between the input device subsystem to the host; using the challenge response and one or more of the plurality of values to determine whether the challenge response is authentic; and selectively enabling functionality of the input device subsystem with the host if the challenge response is authentic.

In accordance with another embodiment of the present invention, a computer program product includes an authentication program configured to access a table comprising a plurality of challenges and a plurality of values indicative of authentic responses for the plurality of challenges; use a challenge response and one or more of the plurality of values to determine whether the challenge response is authentic, wherein the challenge response is in response to a selected challenge; and selectively enable functionality with an input device subsystem based on whether the challenge response is authentic; and computer-readable media bearing the authentication program.

In accordance with yet another embodiment of the present invention, an authentication system includes: an input device subsystem including: a sensing module configured to obtain a set of sensor values using at least one sensing element of the input device; and a first authentication module configured to derive a challenge response based on a selected challenge and a hashing algorithm; and a host system communicatively coupled to the input device subsystem, the host system including: a memory configured to store a table comprising a plurality of challenges and a plurality of values indicative of authentic responses to the plurality of challenges; and a second authentication module coupled to the memory and configured to: compare the challenge response to one or more of the plurality of values to determine whether the challenge response is authentic; and selectively enable functionality with the input device subsystem based on whether the challenge response is authentic.

BRIEF DESCRIPTION OF DRAWINGS

Various embodiments of the present invention will hereinafter be described in conjunction with the appended drawings, where like designations denote like elements, and.

DETAILED DESCRIPTION OF THE INVENTION

In general, and as set forth in greater detail below, the present invention relates to systems and methods for authenticating an input device subsystem with a host (e.g., a device driver, a microprocessor, or the like) wherein a challenge is selected from a table that is stored, for example, at the host, and a challenge response is generated, for example, at the input device subsystem. The functionality of the input device subsystem is then selectively enabled based on the authenticity of the challenge response. In this way, a relatively low cost, easy-to-implement authentication strategy can be incorporated into input device subsystems and their intended hosts.

Figure 1:
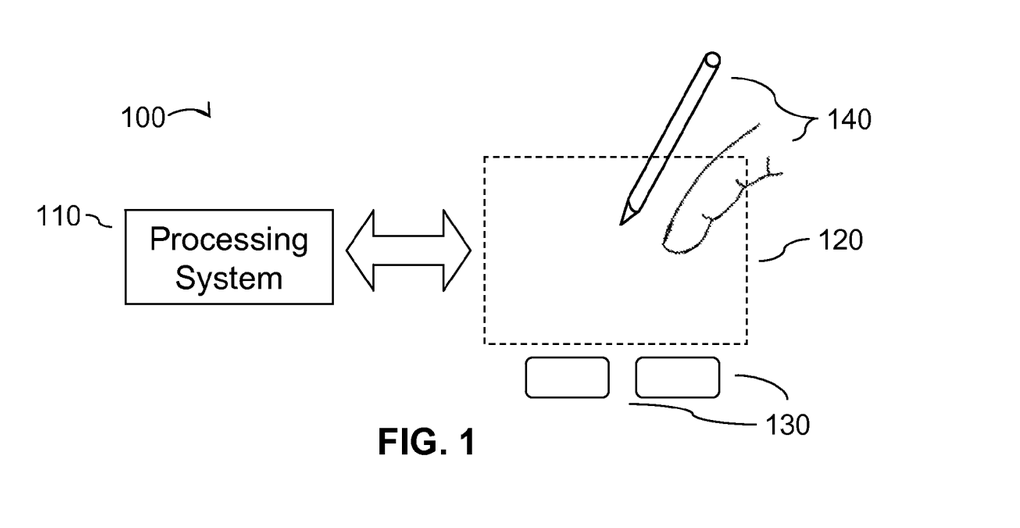
FIG. 1 is a conceptual block diagram of an input device in accordance with one embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, surface acoustic wave, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitting electrodes and one or more receiving electrodes. Transmitting sensor electrodes may be modulated relative to a reference voltage (e.g., system ground) to facilitate transmission, and receiving sensor electrodes may be held substantially constant relative to the reference voltage to facilitate receipt. Sensor electrodes may be dedicated transmitters or receivers, or may be configured to both transmit and receive.

In FIG. 1, a processing system (or "processor") 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components; in some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

Figure 2:
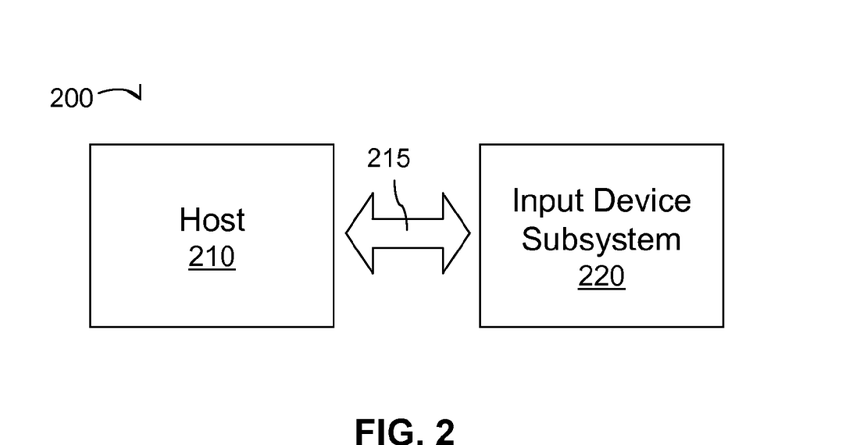
FIG. 2 is a conceptual block diagram of an authentication system in accordance with one embodiment of the invention.

Referring now to the conceptual block diagram shown in FIG. 2, an exemplary authentication system 200 in accordance with one embodiment of the present invention generally includes an input device subsystem 220 and a host 210 configured to communicate via a data connection 215. In general, as mentioned above, it is desirable to enable input device subsystem 220, when authenticated, to operate (with some appropriate level of functionality) with host 210.

Depending upon the specific implementation and context in which authentication system 200 is being employed, the particular circuit components, software, firmware, and the like that are respectively comprised by host 210 and input device subsystem 220 may vary widely. Stated another way, the functional "dividing line" between host 210 and input device subsystem 220 will vary depending upon, for example, the nature of input device subsystem 220 and host 210.

Thus, considering momentarily FIG. 1 in relation to FIG. 2, one or more of the functional modules comprised by processing system 110 (described in detail above) may also be part of host 210, while others may be part of input device 220. In other embodiments, the functional modules comprised by processing system 110 may be separate and distinct from those comprised by host 210 and/or input device subsystem 220—e.g., an embodiment in which input device subsystem 220 includes the entirety of input device 100.

In one embodiment, host 210 comprises what is commonly known as "device driver" software which, when suitably executed (e.g., by a processor, CPU, etc.), is configured to operate in conjunction with input device subsystem 220. In another embodiment, host 210 comprises operating system software (e.g., Linux, Windows, Mac OS, iOS, Android, Palm OS, or the like). In yet another embodiment, host 210 comprises a conventional television system, set-top box, audio system, or the like, and input device subsystem 220 comprises a remote control device configured to remotely control the operation of host 210. The terms "host" and "input device subsystem" thus comprehend a wide range of embodiments in which it is desirable to authenticate some form of input device to the host with which it operates.

Accordingly, data connection 215 may comprise any suitable wired or wireless connection adapted (via appropriate hardware and communication protocol) to provide data communication between host 210 and input device system 220. Data connection 215 may comprise, for example, a data connection conforming to one or more of the IEEE 802.11 family of standards (e.g., WiFi), a PS/2 connection, a ZigBee connection, an Ethernet connection, an Infrared connection, a Bluetooth connection, a WiMAX connection, an inter-integrated circuit ($I^2C$) connection, a serial peripheral interface (SPI) connection, a universal serial bus (USB) connection, an RF connection, an Infrared Data Association (IRDA) connection, or any other data connection now known or later developed.

Having thus given an overview of an exemplary authentication system 200, a more particular embodiment will now be described in conjunction with FIGS. 3 and 4, which depict, respectively, conceptual block diagrams of a host 210 and an input device subsystem 220 in accordance with an exemplary embodiment.

Figure 3:
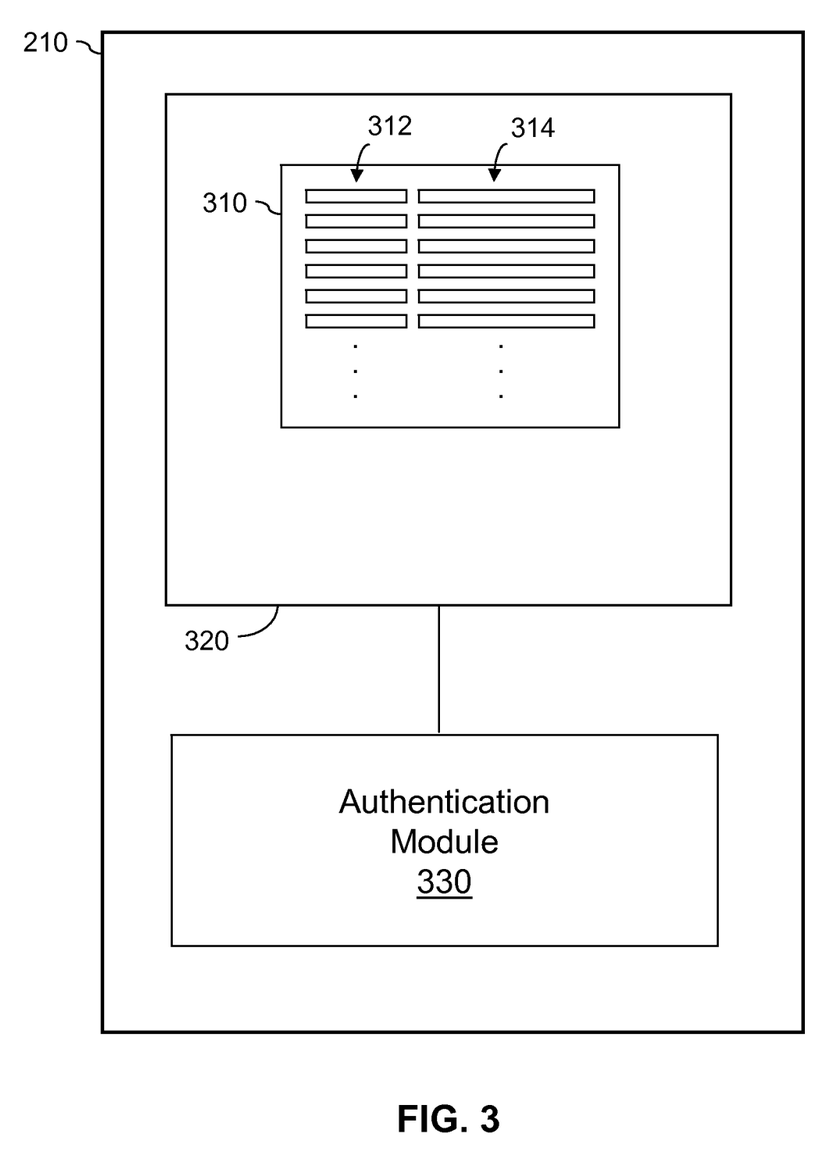
FIG. 3 is a conceptual block diagram of a host in accordance with one embodiment of the present invention.

Referring first to FIG. 3, host 210 includes an authentication module 330 communicatively coupled to a memory 320, which is configured to store a table 310 comprising a plurality of challenges 312 and a plurality of values 314 indicative of authentic responses to the plurality of challenges 312. Challenges 312 and values 314 may take a variety of forms, including long integer values, hexadecimal numbers, binary numbers, alphanumeric strings, and the like. Memory 310, challenges 312, and values 314 are illustrated conceptually; the figure is not intended to limit the embodiment to a one-to-one or pairwise correspondence of values 314 and challenges 312.

While values 314 are indicative of authentic responses, they are not necessarily themselves authentic responses. That is, the number of values 314 may be less than, equal to, or greater than the number of challenges 312, and the relationship between challenges 312 and values 314 may be one-to-one, one-to-many, or many-to-one. Values 314 and challenges 312 may also be encrypted, partitioned into multiple pieces, or otherwise obfuscated. It will also be appreciated that host 210, in practical embodiments, will typically include additional components, such as a data communication interface (not illustrated) for communicating with input device subsystem 220 via data connection 215, as illustrated in FIG. 2.

In one embodiment, the list of challenges 312 may be chosen to be arbitrarily large—e.g., such that its tabulation is too large to be encapsulated directly in any cost-effective device seeking to impersonate an authentic input device subsystem 220, but is still small enough to be stored within host 210, which in this embodiment has much greater storage capabilities. If host 210 is a software program running on a conventional handheld, laptop, or notebook computer, table 310 might be stored in a file on a hard disk (not illustrated). If input device subsystem 220 uses a small microcontroller chip for storage, then including the entire table 310 within its memory would be prohibitively more expensive per byte than hard disk storage.

Host 210 is configured to use a challenge response and one or more of the plurality of values 314 to determine whether the challenge response is authentic (e.g., corresponding to a "correct" or corresponding challenge 312). Host 210 may use the challenge response and values 314 in a variety of ways, including, for example, simple comparison, decryption/encryption, assembly, and any other appropriate mappings.

Host 210 is further configured to selectively enable functionality with input device subsystem 220 based on whether the challenge response is authentic (as described in further detail below).

Figure 4:
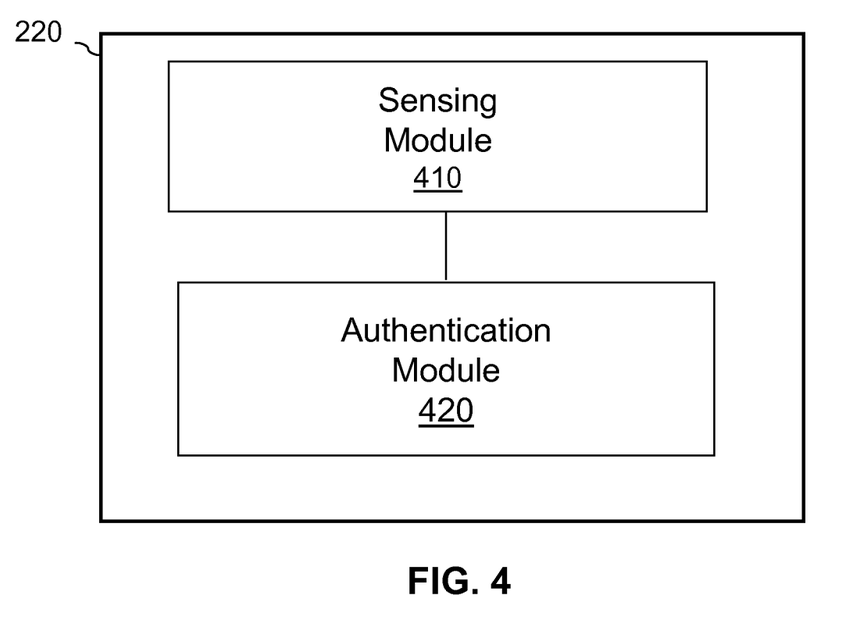
FIG. 4 is a conceptual block diagram of an input device subsystem in accordance with one embodiment.

Referring now to FIG. 4, in the illustrated embodiment input device subsystem 220 includes a sensing module 410 communicatively coupled to an authentication module 420. As in FIG. 3, in practical embodiments, input device subsystem 220 will typically include additional components, such as a data communication interface (not illustrated).

Sensing module 410 is configured to obtain a set of sensor values using at least one sensing element of the input device 100 (for example, described above in connection with FIG. 1). Authentication module 420 is configured to derive a challenge response based on a selected challenge (e.g., a challenge selected from table 310 in FIG. 3) and a hashing algorithm, which may be stored within authentication module 420 along with a "key," as will be discussed in further detail below.

The term "hashing algorithm" is used in its customary sense—i.e., an algorithm that converts an input string to an output string. As is known in the art, some hash algorithms will produce distinct outputs for distinct inputs, while others might produce collisions. In a particular embodiment, the hash algorithm is a secure hash algorithm of the type that it is intractable to determine which input will produce a given output.

Figure 5:
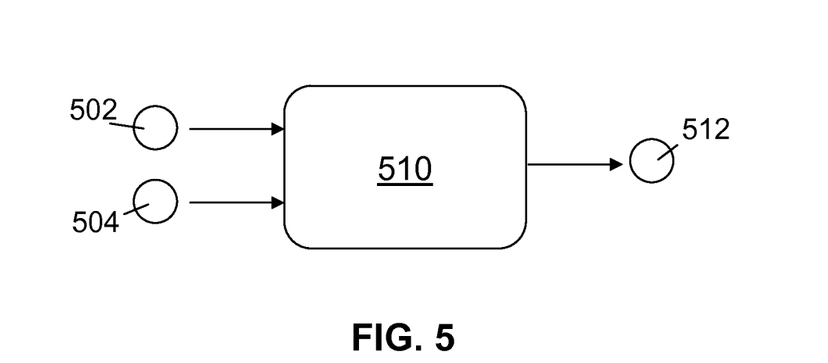
FIG. 5 is a conceptual block diagram depicting the operation of a hashing algorithm in accordance with one embodiment of the invention.

In one embodiment, as illustrated conceptually FIG. 5, the hashing algorithm 510 is configured to combine the selected challenge 502 with a key 504 to produce challenge response 512. It will be appreciated that the term "combine," as used this context, encompasses a wide range of functions, including, for example, addition, factor multiplication, and the like.

Hashing algorithm 510 may be a commonly known cryptographic hash function such as a secure hash algorithm (SHA) or a Message-Digest algorithm 5 (MD5) that combines key 504 with the selected challenge 502 to produce challenge response 512. In one embodiment, hashing algorithm 510 is adapted to map 32-bit challenges 502 onto 8-bit responses 512. As explained above, the hashing algorithm 510 may be implemented using any appropriate hash function that is at least reasonably secure, including well-known, standard hash functions such as MD5 and SHA. For example, if the hashing algorithm 510 is based on a hash function that transforms 256-bit input blocks into 128-bit output blocks, then the hashing algorithm 510 could be calculated by combining the 32 challenge bits with 224 secret "key" bits to produce a 256-bit input block which is passed through the hash function 510 to produce a 128-bit result block, from which 8 bits are drawn arbitrarily to obtain the 8-bit challenge response.

In a particular embodiment, the hashing algorithm 510 is a Corrected Block Tiny Encryption Algorithm (XXTEA). The XXTEA method, which may be used for fast and reversible encryption or decryption of large messages, may also be augmented for the purpose of hashing small challenges by applying several rounds of the encryption or decryption function with an additional mixing operation between rounds.

In one embodiment utilizing a 32-bit challenge message, the 32-bit size of the challenge allows for $2^{32}$ (about four billion) potential distinct challenge messages. Table 310 may contain a strict subset of these challenges. For example, the first 12 bits of the challenge may be set to the same fixed 12-bit pattern, while the other 20 bits of the challenge are chosen randomly, resulting in a pool of $2^{20}$ (about one million) possible challenges. The hashing function 510 may then be used to generate the responses to all $2^{20}$ challenges (about one million entries) to be stored in table 310.

In one embodiment, key 514 is a 256-bit pattern that is stored, for example, within authentication module 420 (as firmware, software, etc.). Keys of greater or smaller bit lengths may be used, depending upon the desired level of security. Key 514 may be selected using a high-quality random number generator such that the "randomness" of the keys cannot easily be detected by a human.

In one embodiment in which host 210 comprises device driver software configured to support several products, product families, or the like (generally, "types"), table 310 may not store all of the full-sized tables for each type. That is, each product (e.g., input device subsystem 220) then may include two keys 514, one common to all types, and another specific to a particular type. The driver may then choose randomly whether to issue a common or type-specific challenge. Because the driver stores only one table for the common challenges, it may afford to use a relatively very large table that would be far too expensive to embed directly in an impostor product. The type-specific challenges may then use smaller challenge pools so that their table sizes are minimized. One advantage of such an approach is that if the key 514 of a particular type is compromised for one type, the authentication security may be weakened, but may not be completely compromised, for other types.

Figure 6:
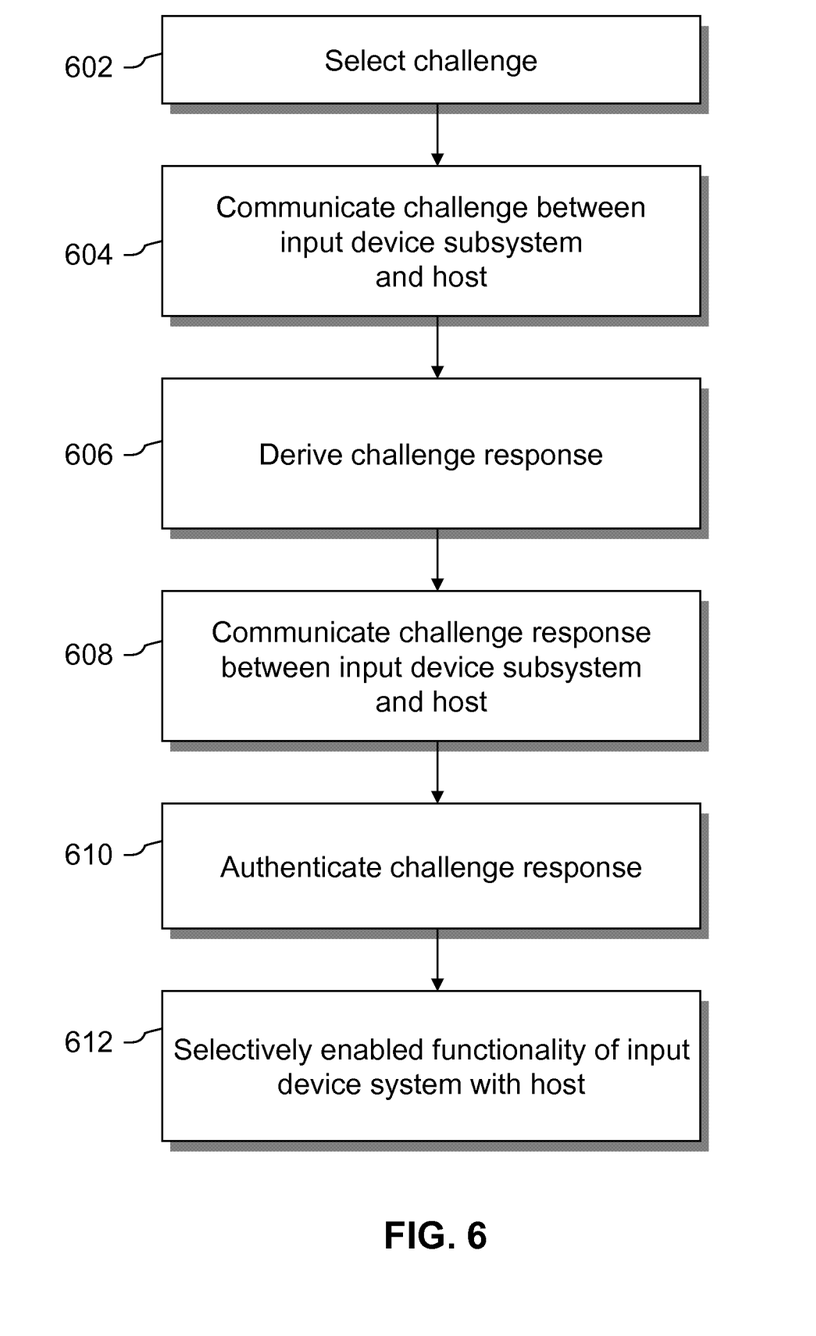
FIG. 6 is a flowchart depicting a method in accordance with one embodiment of the present invention.
Figure 7:
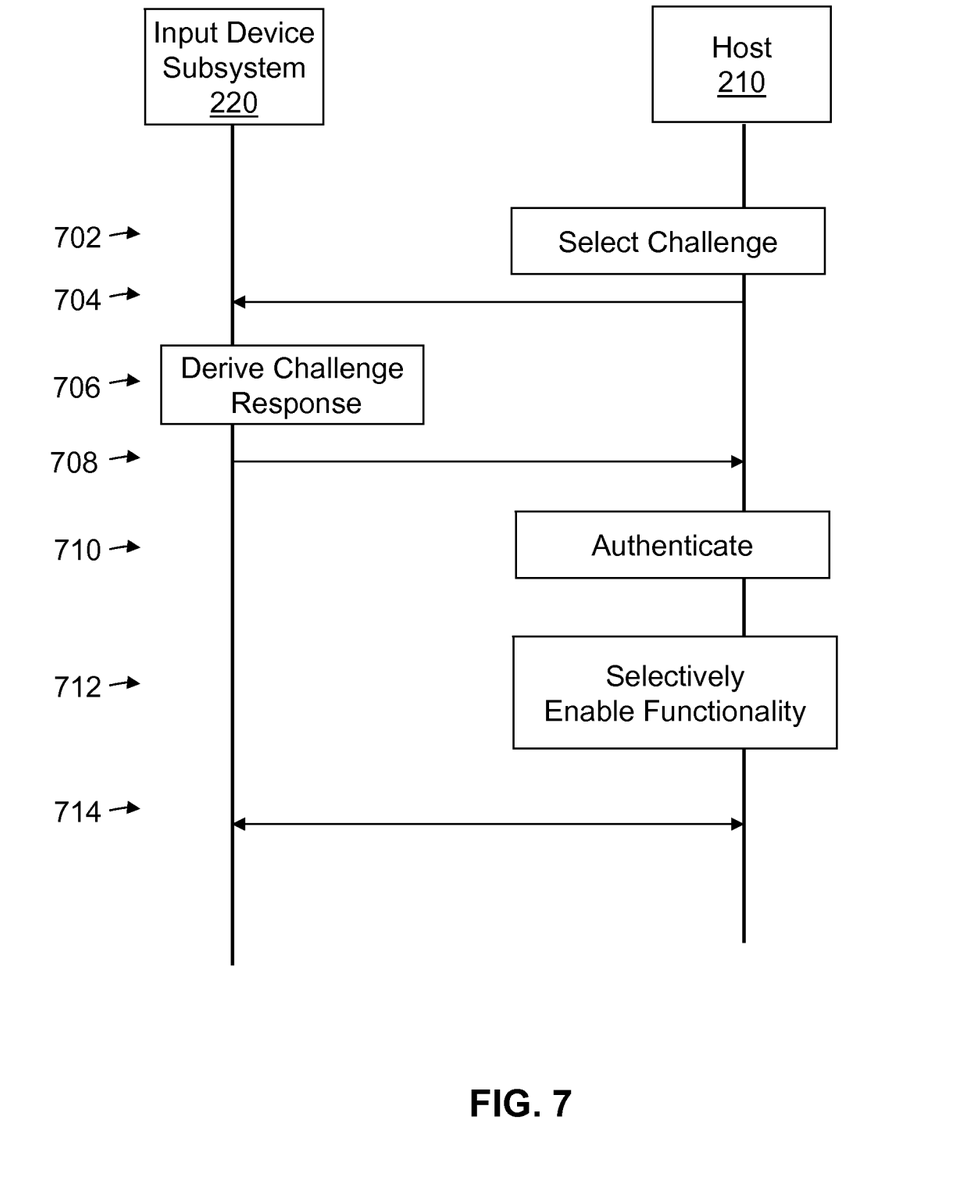
FIG. 7 is a flowchart depicting a method in accordance with one embodiment of the present invention.

Having thus described a host 210 and an input device subsystem 220 in accordance with various embodiments of the invention, an exemplary authentication method will now be described. In that regard, FIG. 6 presents a flowchart depicting a generalized authentication method in accordance with the present invention, and FIG. 7 presents a more particular method that may be implemented, for example, in connection with the host 210 and input device subsystem 220 of FIGS. 3 and 4. The description that follows will refer to both FIGS. 6 and 7.

As shown in FIG. 6, the exemplary method begins, in step 602, with a challenge being selected. This selection may be performed by either host 210 or input device subsystem 220. In the particular embodiment shown in FIG. 7, for example, the challenge is selected by host 210 (step 702).

Selection of the challenge may be random, pseudo-random, non-random, or based on a signal or state of either host 210 or input device subsystem 220. In one embodiment, the selection of the challenge is based on one or more of the sensor values—e.g., the "positional information" as detailed above. That is, some form of user activity is used to select the challenge. More particularly, the selected challenge may be based on the result of applying a predetermined set of criteria to the set of sensor values. The predetermined set of criteria includes one or more rules, Boolean expressions, arbitrary software code, or any other form of criteria that takes as its input one or more sensor values, and produces an output (the "result") that is then used in some way to select the challenge.

For example, the set of criteria may be such that, every time the X-coordinate and/or Y-coordinate of the sensor value crosses some threshold boundary (for example, half-way across the touchpad, modified by a hysteresis band) a number of bits of the challenge (e.g., four bits), or a number to be used in selecting the challenge, is generated. At some point, the collected bits can be used as the basis for selecting the challenge. In one embodiment, the predetermined criteria is known to both host 210 and input device subsystem 220 a priori. The host 210 and input device 220 are then able to select the identical challenge independently (and without further communication regarding the choice), because both share the same selection criteria. Additional constraints may be placed on selection of the challenge. For example, the selection of the same challenge twice in a row may not be allowed.

As mentioned above, if both host 210 and input device 220 are aware of the selection criteria a priori, then it is not necessary to communicate the challenge between the parties. In such an embodiment, step 604 in FIG. 6, and 704 in FIG. 7, are not applicable, and can be skipped.

In another embodiment, the selected challenge is based, at least in part, on the type of the input device subsystem 220 and/or the type of the host 210. "Type," as used in this context, may refer to the model, firmware version, or any other category used to characterize devices in accordance with some taxonomy. For example, the selected challenge may be selected from a strict subset (or "proper subset") of the table, the strict subset of the table being based on at least one of the type of the input device and the type of the host. The term "strict subset" is used herein in the customary sense of a subset having at least one fewer member than its corresponding parent set.

After selection of the challenge by either party, the selected challenge is then communicated between input device subsystem 220 and host 210 (i.e., from input device subsystem 220 to host 210, or vice versa) (step 604). In the embodiment of FIG. 7, for example, the selected challenge is communicated from host 210 to input device subsystem 220 (step 704).

Next, in step 606, a challenge response is derived based on the selected challenge (e.g., using a hashing algorithm, as detailed above). In the embodiment of FIG. 7, for example, the derivation of the challenge response is performed by input device subsystem 220.

In step 608, the challenge response is communicated between input device subsystem 220 and host 210 (with data communication being opposite of that in step 604). As shown in the embodiment of FIG. 7, input device subsystem 220 may communicate the challenge response to host 210. The challenge response may be communicated as clear text, encrypted, or otherwise obfuscated. In an alternate embodiment, input device subsystem 220 selects the challenge itself and then derives the challenge response. Both the challenge and the challenge response are then communicated to host 210.

Next, in step 610, an attempt is made to authenticate the challenge response (e.g., using the challenge response and one or more of the plurality of values 314 of FIG. 3). Authentication may be performed by either input device subsystem 220 or host 210. In the embodiment of FIG. 7, for example, authentication is performed by host 210 (step 710).

In step 612, based on the result of step 610, the functionality of input device subsystem 220 with host 210 is selectively enabled. Selectively enabling functionality comprehends a wide range of operations, including, without limitation, enabling all functionality appropriate for input device subsystem 220 (e.g., based on its type, firmware version, etc.), partial disablement of features (e.g., by "turning off" particular functions included in a device driver), and total disablement of functionality (inability to use the input device subsystem 220). In various embodiments, it might be desirable to provide a "back door" or override that allows input device subsystem 220 to operate with host 210 notwithstanding an unsatisfactory authentication result in step 610.

Subsequently, as shown in step 714 of FIG. 7, input device subsystem 220 will then operate in conjunction with host 210 in the normal manner, that is, in accordance with the functionality appropriate based on the result of the authentication step (710).

It will be appreciated that the methods described above may include additional intermediary steps that, for the purposes of clarity, are not, and need not, be described or illustrated. For example, in most practical implementations, input device subsystem 220 and host 210 will have established some form of data communication (e.g., through a standard PS/2 protocol) prior to engaging in the authentication methods shown in FIGS. 6 and 7. Similarly, the methods described above may be part of a larger process. For example, the illustrated methods may take place during a startup process (e.g., during startup of a personal computer).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for an input device, the processing system comprising:
    a memory comprising a plurality of challenges and a plurality of values indicative of authentic responses to the plurality of challenges;
    a sensing module, including sensing circuitry, configured to acquire a set of sensor values using at least one sensing element of the input device; and
    an authentication module configured to derive a challenge response based on a selected challenge and a hashing algorithm, wherein the challenge response is communicated to a host to selectively enable functionality with the host;
    wherein the selected challenge is based on the set of sensor values acquired by the sensing module.

2. The processing system of claim 1, wherein the authentication module is further configured to provide the selected challenge.

3. The processing system of claim 1, wherein the selected challenge is further based on positions associated with the set of sensor values acquired by the sensing module.

4. The processing system of claim 1, wherein the selected challenge is based on a result of applying a predetermined set of criteria to the set of sensor values.

5. The processing system of claim 1, wherein the selected challenge is based on at least one of a type of the input device and a type of the host.

6. The processing system of claim 1, wherein the hashing algorithm is configured to combine the selected challenge with a key to produce the challenge response.

7. The processing system of claim 1, wherein the hashing algorithm is a Corrected Block Tiny Encryption Algorithm (XXTEA).

8. A method of authenticating an input device subsystem for operation with a host, the method comprising:
    storing a table comprising a plurality of challenges and a plurality of values indicative of authentic responses to the plurality of challenges;
    communicating a selected challenge from the plurality of challenges between the input device subsystem and the host, wherein the selected challenge is based on a set of sensor values acquired from the input device subsystem;
    deriving a challenge response based on the selected challenge and a hashing algorithm;
    communicating the challenge response between the input device subsystem to the host;
    using the challenge response and one or more of the plurality of values to determine whether the challenge response is authentic; and
    selectively enabling functionality of the input device subsystem with the host if the challenge response is authentic.

9. The method of claim 8, wherein:
    each of the plurality of challenges is associated with one or more of the plurality of values; and wherein
    using the challenge response and one or more of the plurality of values comprises matching the challenge response with the associated one or more plurality of values.

10. The method of claim 8, wherein the table is stored within the host and the hashing algorithm is stored within the input device subsystem, and wherein the input device subsystem is configured to derive the challenge response.

11. The method of claim 8, wherein the selected challenge is selected by the input device subsystem and communicated from the input device subsystem to the host.

12. The method of claim 8, wherein the selected challenge is selected from a strict subset of the table, the strict subset of the table being based on at least one of a type of the input device subsystem and a type of the host.

13. A computer program product comprising a non-transitory computer-readable medium having computer-readable software instructions embodied therein, the computer readable software instructions comprising:

an authentication program, the authentication program configured to:

access a table comprising a plurality of challenges and a plurality of values indicative of authentic responses for the plurality of challenges;

use a challenge response and one or more of the plurality of values to determine whether the challenge response is authentic, wherein the challenge response is based on a selected challenge and a hashing algorithm, the challenge response is in response to the selected challenge, and the selected challenge is based on a set of sensor values acquired from an input device subsystem; and selectively enable functionality with the input device subsystem based on whether the challenge response is authentic.

14. The computer program product of claim 13, further including device driver program code associated with the input device subsystem and responsive to the selectively enabled functionality.

15. An authentication system comprising:

an input device subsystem including:

a sensing module configured to obtain a set of sensor values using at least one sensing element of an input device; and a first authentication module configured to derive a challenge response based on a selected challenge and a hashing algorithm, wherein the selected challenge is based on one or more sensor values within the set of sensor values; and a host system communicatively coupled to the input device subsystem, the host system including:

a memory configured to store a table comprising a plurality of challenges and a plurality of values indicative of authentic responses to the plurality of challenges; and a second authentication module coupled to the memory and configured to:

compare the challenge response to one or more of the plurality of values to determine whether the challenge response is authentic; and selectively enable functionality with the input device subsystem based on whether the challenge response is authentic.

16. The authentication system of claim 15, wherein the host system comprises a device driver for the input device subsystem.

17. The authentication system of claim 15, wherein the selected challenge is based on at least one of a type of the input device subsystem and a type of the host system.

18. The authentication system of claim 15, wherein the selected challenge is based on a result of applying a predetermined set of criteria to the set of sensor values.

* * * * *